United States Patent Office 3,575,875
Patented Apr. 20, 1971

3,575,875
METHOD FOR PREPARING URANIUM-CONTAINING AQUASOLS EMPLOYING A PLATINUM OXIDE CATALYST
William L. Pattison, Knoxville, and John P. McBride, Oak Ridge, Tenn., assignors to the United States of America as represented by the United States Atomic Energy Commission
No Drawing. Filed May 1, 1969, Ser. No. 821,098
Int. Cl. C09k 3/00
U.S. Cl. 252—301.1                                    6 Claims

ABSTRACT OF THE DISCLOSURE

A platinum oxide catalyst, which has the unique property of becoming highly flocculated in the reduced state, is employed in an improved method for preparing stable uranium-containing aquasols from a uranium (VI)-containing feed solution which is catalytically reduced by hydrogen to a uranium (IV)-containing solution in a flow-through reductor vessel. The reduced platinum oxide catalyst is readily retained in the reductor vessel on a porous filter and the uranium (IV)-containing solution is then processed into a stable uranium-containing aquasol and calcined uranium dioxide microspheres by known sol-gel processes.

BACKGROUND OF THE INVENTION

The invention described herewith was made in the course of, or under, a contract with the U.S. Atomic Energy Commission. It relates generally to a process for preparing stable aquasols and more particularly to an improved process for preparing uranium-containing stable aquasols.

The preparation of uranium dioxide stable aquasols by sol-gel techniques for reactor fuel applications has been widely demonstrated. Heretofore, systems employing various anions, i.e., chloride, nitrate, etc., have been used in the preparation of these aquasols. It is desirable to work in a nitrate system in the preparation of ceramic reactor fuels because of the relative certainty of freedom from impurities corrosive to materials used in nuclear fuel systems. Moreover, inasmuch as an attractive aqueous method for reprocessing spent reactor fuels provides a readily available source of uranium as a uranyl nitrate solution, it is desirable to employ a uranyl nitrate solution as a feed solution for such aquasol processes. Previously, it has been found necessary to reduce the uranium (VI) to uranium (IV) in order to produce a final calcined product of high density. In one method disclosed in U.S. Pat. 3,401,122, issued on Sept. 10, 1968, in the names of Guido Cogliati et al., for "Process for Producing Dense Particles of Oxides of Actinides Usable As Fuels for Nucear Reactors," dense particles of uranium dioxide (and thorium-uranium oxide) were prepared from an acid-deficient solution of uranyl nitrate by batchwise catalytic hydrogen reduction of the uranium (VI) to uranium (IV) with a pulverized platinum-on-$Al_2O_3$ catalyst to form a uranium dioxide sol which was then filtered, separated from the catalyst and formed into calcined uranium dioxide particles. The process also was operated continuously employing a pressurized fixed bed of pelletized platinum-on-$Al_2O_3$. In attempting to prepare uranium (IV) feed solutions which were to be formed subsequently into $UO_2$ sols, applicants found that while the settling and filtration times for such a batch process were not objectionable, scale up to production scale throughputs results in inordinately long settling times and serious filtration problems. Furthermore, where the process was operated continuously attempts to make a sol from the uranous (IV) solution from the reductor failed because of the formation of viscous sol in subsequent solvent extraction processing. Batch operation of the fixed catalyst bed avoided formation of the viscous sol but the sol could not be concentrated to optimum concentration (~1 M) without getting thick or setting up as a gel. The resulting uranium (IV) solution contained basic nitrogen species which were believed to cause the hereinbefore noted difficulties. It is therefore an object of this invention to provide an improved process for preparing uranium-containing aquasols wherein these aforementioned difficulties are avoided.

SUMMARY OF THE INVENTION

Applicants have discovered that in a process for preparing uranium-containing aquasols in which uranium (VI)-containing solution is catalytically reduced with hydrogen to a uranium (IV)-containing solution and the uranium (IV)-containing solution is recovered from the catalyst and formed into said aquasol an improvement is achieved by employing a platinum oxide catalyst which is reduced by hydrogen and flocculates in the uranium (IV)-containing solution. In a more specific embodiment of the invention a flow-through reductor vessel is employed wherein uranyl nitrate solution is passed into an inlet end and contacted with the platinum oxide catalyst while sparged with hydrogen and a uranous nitrate solution is passed out the outlet end of the reductor; the fluidized and hydrogen-reduced platinum oxide catalyst is retained within the reductor. This unique flocculating property of the reduced platinum oxide catalyst in the presence of a uranous nitrate solution advantageously affords extremely rapid filtration characteristics. Filtration rates of uranous nitrate solution with the flocculated catalyst through sintered stainless steel plates are visibly faster than for water alone. For a 0.6 M uranyl nitrate-0.3 M formic acid-0.4 M nitric acid feed solution in batch reduction, better than 99.5 percent reduction of the uranium is readily attained with very little or no basic nitrogen species being formed and with less than 10 percent of the formic acid being destroyed and the resulting uranium (IV) solution can be readily formed into stable uranium-containing aquasols without the prior art problems.

DESCRIPTION OF THE PREFERRED EMBODIMENT

The process may be carried out in conventional equipment. One embodiment comprises an upright cylindrical reductor vessel (14 liters capacity) fabricated from a 48-inch length of 6-inch diameter standard glass pipe, fitted with stainless steel compression flanges and end caps as closure members at the top and bottom. The top end cap includes accesses for a solution inlet, a stirrer shaft, a gas inlet and vent, and electrode conductors. A cone-shaped end cap is compressibly joined to the lower end of the pipe with a sintered stainless steel, 10-micron nominal porosity disc sealably interposed therebetween. The conical end cap includes access for hydrogen or argon and a liquid drain conduit.

In carrying out the process, which will be hereinafter discussed with particular reference to a continuous process, though it is to be understood that the process could equally be conducted batchwise, the reductor vessel is purged of all air with argon or any other suitable non-oxidizing gas and the platinum oxide catalyst placed in the reactor vessel. While the catalyst may be added in any convenient manner it is preferred where formic acid is present that it be mixed as a slurry with dilute nitric acid, pumped into the reductor vessel, reduced and flocculated with hydrogen and washed with water. This is to insure that no ammonia is formed by reaction between the formic acid and nitric acid. If no formic acid is present the catalyst may be added directly with the uranyl nitrate solution. In general, suitable concentrations of the platinum oxide catalyst are 2 to 10 grams of platinum per liter of solution to be reduced.

The uranium-containing solution, such as a 0.2 M uranyl nitrate-0.1 M formic acid-0.1 M nitric acid solution, is next pumped into the reductor vessel and contacted with the platinum oxide slurry under conditions of thorough stirring. The purge gas is then valved off.

The reduction step of the process is initiated by sparging the well stirred suspension in the reductor vessel with hydrogen which is added through a gas diffuser stone immersed in the suspension at a point just above the filter plate. In this step the uranium (VI) is reduced to uranium (IV). Applicants found that quite unexpectedly the reduced platinum oxide in the presence of excess hydrogen became highly flocculated so that when the reduction of the uranium is nearly complete the catalyst settles very rapidly and all the catalyst is retained on the filter. The flocculating property of the reduced platinum oxide catalyst affords excellent filtration characteristics over the catalysts previously employed in sol-gel processes.

In order to achieve the optimum filtration rate the convective conditions within the reductor vessel must be such as to preclude buildup of a layer of the reduced platinum oxide flocs on the filter plate. A stirring speed of 600 r.p.m. with a 1" x 3¾" Teflon blade in a laboratory unit of 1.6 liters capacity was quite suitable to preclude this deleterious buildup of catalyst on the filter plate.

Control of the reduction step is conveniently achieved by measuring the redox potential of the suspension and regulating the uranium (VI) reduction flow rate and the convective conditions within the reductor vessel. Under steady-state conditions at the desired percentage of uranium (IV) composition, which is monitored by the electrode potential of the solution, the pumping rate of the uranium (VI)-containing solution is equal to the removal rate of the uranium (IV)-containing solution. The end point of the reduction is readily detected as a sharp break in EMF which occurs when reduction has progressed to between 96 and 100 percent uranium (IV). As an illustration, control of the steady-state rate of reduction for a 1.6 liter reduction chamber is accomplished by pumping 3 liters per hour of a 0.2 M uranium (VI) nitrate solution into the top of the reactor and removing the same volume of solution through the bottom filter. In the reductor vessel the uranium (VI) which enters the vessel as a uranyl nitrate solution is reduced to uranium (IV) as a uranous nitrate solution and the platinum oxide is reduced to a highly flocculated state. Thus, under continuous flow, steady-state conditions the upper region of the reductor vessel contains some uranium (VI), the lower region of the reductor vessel contains substantially all uranium (IV), and the intermediate region contains a uranium (VI)-uranium (IV) gradient.

The uranium (IV)-containing solution, which typically is 0.2 M uranium with a nitrate/uranium ratio of 3.0 and 99 percent uranium (IV), is then employed as a feed solution for $UO_2$ sol preparation. Various sol-gel methods have been heretofore described for the successful preparation of stable $UO_2$ sols from uranium (IV) feed solutions. For example and by way of illustration only, a uranium (IV)-containing solution has been formed into stable $UO_2$ sols by solvent extraction. In U.S. Pat. 3,367,881, issued Feb. 6, 1968, to Leon E. Morse there is disclosed a method of preparing a uranous sol from an aqueous nitrate solution containing tetravalent uranium comprising extracting a portion of the nitrate from the aqueous solution with an organic solution of an amine, such as 0.1 M n-lauryltrialkylmethylamine, in diluent of a n-paraffin hydrocarbon containing mainly n-dodecane, permitting the aqueous phase containing a portion of nitrate to adjust the lowered nitrate conditions, and then extracting additional nitrate from the resulting solution. The resulting uranous sol is then evaporated to a concentration of about 1.5 M uranium. Another suitable method for preparing a uranous sol is described in copending application S.N. 814,311, filed on Apr. 8, 1969, in the names of John McBride et al. for "Production of Predominantly Crystalline Sols."

The concentrated uranous sol is next dispersed into sol droplets in a sphere-forming column containing an organic dehydrating solvent, such as 2-ethylhexanol. The congealed droplets are dried and calcined in a heated stream of either dry argon or argon-steam gas and fired at 1000°–1200° C. to form high density uranium dioxide microspheres. The preparation of the uranium dioxide microspheres from uranous sols is disclosed more fully in U.S. Pat. No. 3,290,122, issued Dec. 6, 1966, in the names of Sam D. Clinton et al., for "Process for Preparing Oxide Gel Microspheres From Sols."

Having described the invention in a general fashion the following examples are provided to indicate with greater particularity the process parameters and techniques of the present invention.

EXAMPLE I

The feasibility of conducting the reduction of uranium (VI) to uranium (IV) continuously in a slurry-type, flow-through reductor vessel utilizing a flocculating platinum oxide catalyst was performed in the apparatus as hereinbefore described as follows. The reductor vessel was purged of all air by passing argon through the gas line at the bottom section of the vessel below the filter disc, displacing the air through the gas vent line. Twenty (20) grams of "Adams Platinum Oxide" catalyst (85% weight platinum), commercially available from Engelhard Minerals and Chemical Corporation, Newark, N.J., was formed into a slurry with 0.08 M nitric acid solution (500 mls.). This addition corresponded to 10–15 grams per liter of contained liquid volume. The platinum oxide catalyst slurry was pumped into the reductor vessel through the line used for the uranium (VI) feed solution. Hydrogen gas was added through the diffuser stone for two or three minutes until the reduced catalyst flocculated. Then 1 to 2 liters of water were pumped in while removing the dilute nitric acid through the filter.

A uranium (VI)-containing feed solution, 0.2 M uranyl nitrate-0.1 M formic acid-10.1 M nitric acid, having a nitrate/uranium ratio of 3 and a formate/uranium ratio of 0.5 was next pumped into the reductor vessel through the solution inlet line at the top of the vessel and stirred thoroughly (600 r.p.m.) with the reduced platinum oxide catalyst slurry. The flow rate of the uranium (VI)-containing feed solution was 3 liters per hour after the reduction vessel was filled and the solution reduced which provided a steady-state rate condition of 99 percent uranium (IV).

The reduction of the uranium (VI) to uranium (IV) was initiated by valving off the argon purge gas and passing hydrogen gas into the reductor vessel through the gas addition line containing the diffuser stone at the bottom of the reductor vessel. The hydrogen gas flow rate was adjusted to give about 5 to 10% excess $H_2$ in the gas vent line and provided excess pressure about 1–4 inches of water as excess hydrogen pressure. The reduction was monitored by measuring the redox potential of the suspension using a platinum electrode vs. a reference Ag, AgCl electrode system. These data are given in tabular form in Table I below. When the reduction had progressed to about 100 percent uranium (IV) being formed a sharp break in EMF occurred which provided a readily detectable end point of the reduction phase. The reduced platinum oxide catalyst became highly flocculated in the presence of excess hydrogen and it settled very rapidly (gravity filtration time of 12 minutes for 1.6 liters) near the end point of the uranium reduction, being retained on the filter as the uranium (IV)-containing solution was passed out of the reductor vessel.

TABLE I.—REDUCTION OF URANIUM (VI)-CONTAINING SOLUTION

| Elapsed time, minutes | Redox potential, mv. | Percent Uranium (IV) |
|---|---|---|
| 0 | +20 | a 0.0 |
| 53 | −253 | b 100.0 |
| 66 | −230 | 99.88 |
| 76 | −225 | 99.85 |
| 86 | −225 | 99.85 |
| 96 | −230 | 99.88 |
| 106 | −235 | 99.91 |
| 126 | −230 | 99.88 |
| 156 | −235 | 99.91 |
| 186 | −235 | 99.91 |
| 246 | −235 | 99.91 |
| 330 | −200 | 99.00 | a $H_2$ addition started.
b First 1.75 liters reduced and U(VI) feed pump started at 3 liters/hr.

EXAMPLE II

The preparation of a uranium (IV) feed solution by reduction with the platinum oxide flocculating catalyst was demonstrated in a large batch reactor (14 liters capacity). Uranium reduction rates, using a 0.6 M uranyl nitrate-0.3 M formic acid-0.06 M nitrate acid feed solution, with 30 grams of platinum oxide catalyst ranged from 2 moles/hour when only a small excess of hydrogen was used (96 percent utilization) to 3.3 moles/hour at 77 percent hydrogen utilization. Greater than 99.5 percent uranium reduction was readily attained with little or no ammonia being formed (ammonia/uranium ratio≤0.02); less than 10 percent of the formic acid was destroyed. The reduced platinum oxide catalyst over numerous experiments showed no signs of loss in activity or in ease of filtration.

EXAMPLE III

The uranium reduction in the same apparatus and generally the same procedure as given in Example I was performed using a platinum oxide catalyst, lot No. 1410-2, commercially available from Matthey Bishop, Inc., of Malvern, Pa., the platinum assay was 81.60 percent weight and as poured powder was somewhat more dense. Seven (7) grams of the catalyst was mixed with 1800 mls. of uranium (VI)-containing feed solution, 1.0 M uranyl nitrate-0.5 M formic acid and was pumped into the reductor vessel under conditions of thorough stirring. The reduction was initiated by passing hydrogen gas at a flow rate of 200 to 500 ml. excess and the reduction monitored by measuring the redox potential of the suspension.

While the uranium was reduced to 100 percent uranium (IV), the time of the reduction was about twice as long as expected, indicating a somewhat lower specific activity than the Adams catalyst. This type platinum oxide catalyst demonstrated the property of becoming flocculated as did the catalyst used in Example I and was removed to less than 10 p.p.m. in the uranous nitrate solution by a 3″ diameter, medium porosity sintered glass filter. Filtration time (gravity) was about 20 minutes for 1800 ml.

EXAMPLE IV

The uranous solution prepared in Example I was formed into uranium dioxide calcined microspheres as follows. The nitrate was extracted from the uranous solution with a 0.12 M amberlite LA-2 (n-lauryltrialkylmethylamine, M.W. 365) solution in n-dodecane. Extraction was done in 3 stages with a 60° C. digestion of the aqueous phase between the first and second stages.

The final $UO_2$ sol (nitrate/uranium≃0.15) was dispersed into droplets in 2-ethylhexanol containing a small amount of Ethomeen-S/15 and Span 80 as surfactants to form gel microspheres. The gel microspheres were separated from the drying solvent and dried in argon-steam at 150°–200° C. The dried microspheres were then fired to dense uranium dioxide microspheres by heating to 1000° C. in steam (argon carrier gas) and reduced at 1000° C. with argon–4 percent $H_2$ gas.

What is claimed is:

1. In a method for preparing uranium-containing aquasols from uranium (VI)-containing solutions wherein said uranium (VI) is catalytically reduced with hydrogen to uranium (IV) and the resulting uranium (IV)-containing solution is recovered from the catalyst and subsequently formed into said aquasol, the improvement which comprises contacting said uranium (VI)-containing solution with a platinum oxide catalyst which flocculates upon being reduced in hydrogen in said uranium (IV)-containing solution.

2. The method of claim 1 wherein said uranium (VI)-containing solution consists of 0.6 M uranyl nitrate-0.3 M formic acid-0.4 M nitric acid aqueous solution, said solution having a nitrate/uranium ratio of about 2.6 and a formate/uranium ratio of about 0.5.

3. The method of claim 1 wherein said uranium (IV)-containing solution is 0.5 to 1.0 M uranium (IV) nitrate.

4. The method of claim 1 wherein said platinum oxide catalyst is added at a concentration of 2–10 grams per liter of solution.

5. The method of claim 1 wherein said contacting step is conducted continuously comprising feeding said platinum oxide catalyst as a nitric acid slurry into a flow-through type reductor vessel, sparging the slurry with hydrogen until said platinum oxide is reduced and flocculates, removing excess nitric acid with water, feeding said uranium (VI)-containing solution into said vessel, sparging said solution with hydrogen to reduce said uranium (VI) to uranium (IV) and adjusting the flow rate of said uranium (VI)-containing solution and the convective conditions within said reductor whereby essentially all of said uranium (IV) is separately recovered from said reduced platinum oxide catalyst.

6. The method of claim 5 wherein said uranium (VI)-containing solution consists of 0.2 M uranyl nitrate-0.3 M formic acid-0.1 M nitric acid.

References Cited

UNITED STATES PATENTS

| 3,288,717 | 11/1966 | Morse | 252—301.1 |
| 3,312,629 | 4/1967 | Smith | 252—301.1 |
| 3,312,633 | 4/1967 | Smith | 252—301.1 |
| 3,330,772 | 7/1967 | Fitch et al. | 252—301.1 |
| 3,513,101 | 5/1970 | Meservey | 252—301.1 |

CARL D. QUARFORTH, Primary Examiner

S. J. LECHERT, JR., Assistant Examiner

U.S. Cl. X.R.

23—355